(12) United States Patent
Gong et al.

(10) Patent No.: US 10,649,111 B2
(45) Date of Patent: May 12, 2020

(54) AIR-GROUND INTEGRATED EARTH MAGNETIC FIELD COMBINED OBSERVATION METHOD AND SYSTEM

(71) Applicant: CHINA AERONAUTICAL RADIO ELECTRONICS RESEARCH INSTITUTE, Shanghai (CN)

(72) Inventors: Cheng Gong, Shanghai (CN); Jinyan Wang, Shanghai (CN); Xiaonan Jin, Shanghai (CN); Fang Chen, Shanghai (CN); Miao Wang, Shanghai (CN)

(73) Assignee: China Aeronautical Radio Electronics Research Institute, Shanghai (CN)

( * ) Notice: Subject to any disclaimer, the term of this patent is extended or adjusted under 35 U.S.C. 154(b) by 85 days.

(21) Appl. No.: 15/317,740

(22) PCT Filed: Jun. 19, 2014

(86) PCT No.: PCT/CN2014/080299
§ 371 (c)(1),
(2) Date: Apr. 21, 2017

(87) PCT Pub. No.: WO2015/188396
PCT Pub. Date: Dec. 17, 2015

(65) Prior Publication Data
US 2017/0299761 A1    Oct. 19, 2017

(30) Foreign Application Priority Data
Jun. 12, 2014  (CN) .......................... 2014 1 0260329

(51) Int. Cl.
*G01V 3/16* (2006.01)
*G01V 3/40* (2006.01)
*G01V 3/08* (2006.01)

(52) U.S. Cl.
CPC ................ *G01V 3/40* (2013.01); *G01V 3/081* (2013.01); *G01V 3/16* (2013.01)

(58) Field of Classification Search
CPC ............. G01V 3/16; G01V 3/081; G01V 3/40
See application file for complete search history.

(56) References Cited

U.S. PATENT DOCUMENTS 3,943,436 A * 3/1976 Pirson .................... G01V 3/082
324/345
5,355,313 A  10/1994 Moll et al.
(Continued)

OTHER PUBLICATIONS

Jankowski, J. and C. Sucksdoroff, "Guide for Magnetic Measurements and Observatory Practice," International Association of Geomagnetism and Aeronomy, Warsaw (1996).
(Continued)

*Primary Examiner* — Alesa Allgood
(74) *Attorney, Agent, or Firm* — Dentons US LLP (57) ABSTRACT

The invention discloses an air-ground integrated geomagnetic field combined observation method and system. The method comprises the following steps of validating local geomagnetic field model parameters using the geomagnetic field data collected by a mobile earth station before the geomagnetic field survey mission is executed; getting a dynamic model along the flight path using the geomagnetic field data collected by the airborne console over the flight path and the model parameters when the geomagnetic field survey mission is executed; getting a measuring error model along the flight path using the attitude measuring error obtained by the airborne console when the aircraft flies as per the preset attitude; getting the estimation of the geomagnetic field data collected over the flight path in a geographic coordinate frame using the dynamic model and the measuring error model. In the invention, the measuring accuracy of a geomagnetic field vector expressed in the
(Continued)

geographic coordinate frame can be improved, and the geomagnetic field anomaly detection can be implemented.

12 Claims, 2 Drawing Sheets

(56) References Cited

U.S. PATENT DOCUMENTS

| | | | |
|---|---|---|---|
| 5,884,256 A | 3/1999 | Bennett et al. | |
| 5,884,295 A | 3/1999 | Moll et al. | |
| 5,894,323 A * | 4/1999 | Kain | G01C 11/02 |
| | | | 348/116 |
| 6,021,577 A | 2/2000 | Shiells et al. | |
| 2003/0094952 A1* | 5/2003 | Morrison | G01V 3/17 |
| | | | 324/330 |
| 2005/0017721 A1* | 1/2005 | McCracken | G01V 3/16 |
| | | | 324/330 |
| 2012/0081248 A1* | 4/2012 | Kennedy | G01S 5/0242 |
| | | | 342/118 |

OTHER PUBLICATIONS

Alldredge, L.R., "Rectangular harmonic analysis applied to the geomagnetic field," Journal of Geophysical Research 86(B4): 3021-3026 (1981).

Manoj, C., and S. Maus, "Observation of Magnetic Fields Generated by Tsunamis," Eos 92(2): 13-14 (2011).

Idan, M., "Nonlinear Smoothing Identification Algorithm with Application to Data Consistency Checks," Journal of Guidance, Control, and Dynamics 16(2): 337-345 (1993).

Kalman, R., "Discovery and Invention: The Newtonian Revolution in Systems Technology," Journal of Guidance, Control, and Dynamics 26(6): 833-837 (2003).

* cited by examiner

Fig.3 ically, the attitude measurements are noise-contaminated, taking into account that the ambient magnetic field is numerically of large scale, ranging from over 60,000 nT in the south or north pole to approximately 20,000 nT over the equator. The transformation of the magnetic field from the body frame to the geographic frame results in unacceptable errors, which may cause failure to detect the anomalies of measurement.

AIR-GROUND INTEGRATED EARTH MAGNETIC FIELD COMBINED OBSERVATION METHOD AND SYSTEM

This application is a National Stage Entry of International Application No. PCT/CN2014/080299, filed Jun. 19, 2014, and claims the benefit of and priority to Chinese Application No. 201410260329.1, filed Jun. 12, 2014, both of which are incorporated herein by reference in their entirety for all purposes as if fully set forth herein.

TECHNICAL FIELD

The invention relates to a geomagnetic field measuring technology, particularly to an air-ground integrated geomagnetic field combined observation method and relevant system.

BACKGROUND TECHNOLOGY

Earthquakes, tsunamis, mud-rock flows and volcanoes have been great threats to all human beings. It has been reported that during the pre-earthquakes period, the local geomagnetic field, as well as their quiet-solar daily variations, are deviated from their normal values. This calls for continuous surveillance of the geomagnetic field via a distributed network consisting of variance of platforms. The magnetic field vector, acquainted on the airborne platforms, is required to be expressed in a unified geographic coordinate frame. However, the attitude measurements are noise-contaminated, taking into account that the ambient magnetic field is numerically of large scale, ranging from over 60,000 nT in the south or north pole to approximately 20,000 nT over the equator. The transformation of the magnetic field from the body frame to the geographic frame results in unacceptable errors, which may cause failure to detect the anomalies of measurement.

For several decades, aeromagnetic survey has been widely used in fields such as mineral, petroleum and geothermal exploration, and submarine detection for military proposes, all in a platform-centered manner, where only the magnetic anomalies are of interest. Most aeromagnetic survey systems acquire total-field magnetic data only. However, total-field-only survey is not sufficient for the purpose of pre-earthquake magnetic field surveillance.

The followings are further relevant examples that address the issue of aeromagnetic survey and aeromagnetic data processing.

1. U.S. Pat. No. 5,355,313 granted to Moll et al uses neural networks to determine depth of basement rock.
2. U.S. Pat. No. 5,884,256 granted to Moll et al discloses the data processing system that utilizes neural networks to determine mine depth of basement rock, and in particular, describes the layout and working process of the neural network. The above two patents do not describe the measurement and transformation of magnetic field.
3. U.S. Pat. No. 6,021,577 granted to Shiells et al discloses a technique that is utilized to determine a mine orientation by a base station and a mobile site, both made of two or three mutually orthogonal fluxgates magnetometers.
4. The technique report, entitled IMPAC Integrated Multi-Parameter Airborne Console, available at the website www.Picoenvirotec.com, discloses an airborne magnetic field survey system that is provided with four optically pumped cesium vapor magnetometers and a tri-axial fluxgate magnetometer and used to offer the attitude of the aircraft and generate the compensation models of magnetic environment. However, it is not mentioned how the measuring outputs of tri-axial fluxgate magnetometer are transformed into a geographic coordinate frame.

The electromagnetic environment and magnetic field daily variation caused by solar radiation are two important impacts that keep the airborne magnetometers from sensing correct geomagnetic field, and need to be compensated for. However, this invention assumes that the vehicle's magnetic environment and the solar daily variation have been properly compensated, and concentrated on the issue of reduction of measuring errors of the magnetic field due to the inaccurate attitude measurements. The installation error and equipment error are also assumed to be corrected properly.

In order to reduce the magnetic field error induced by inaccurate coordinate transformation, an approach is one of employing three or more twin-frequency GPS receivers with their antennas non-collinear assembly over the aircraft; this approach ensures that the baselines, connecting the antennas, are long sufficiently.

Reference cited are as follows:

1. Jankowski, J., and C. Sucksdoroff, *Guide for Magnetic Measurements and Observatory Practice*, International Association of Geomagnetism and Aeronomy, 1996, Warsaw.
2. Alldredge L. R., Rectangular harmonic analysis applied to the geomagnetic field, *JRG*, 1981, 86(B4), pp 3021~3026.
3. Manoj, C., and S. Maus, Observation of Magnetic fields Generated by Tsunamis, *Eos.*, Vol. 92, No. 2, 11 Jan. 2011.
4. Tsi, J. Digital Techniques for Wideband Receivers ($2^{nd}$ Ed), Norwood, Mass. 02062, U.S.A., Artech House, Inc., 2001.
5. M. Idan, Nonlinear Smoothing Identification Algorithm with Application to Data Consistency Checks, *J. Guidance, Control and Dynamics*, 16(2), April 1993, pp. 337~345.
6. Working Group, Concise Mathematic Handbook, Shanghai Educational Press, 1977 (in Chinese).
7. Kalman, R., Discovery and Invention: The Newtonian Revolution in Systems Technology, *J. of Guidance, Control and Dynamics*, Vol. 26, No. 6, November 2003, pp. 833~837.

SUMMARY OF THE INVENTION

This invention aims to provide an air-ground integrated geomagnetic field combined observation method and system to better solve the problem that the observation data precision of geomagnetic field is not high. Provided is an air-ground integrated geomagnetic field combined observation method according to one aspect of the invention, comprising the following steps:

Validating local geomagnetic field model parameters using the geomagnetic field data collected by a mobile earth station before the geomagnetic field survey mission is executed;

Getting a dynamic model along the flight path using the geomagnetic field data collected by the airborne console over the flight path and the model parameters when the geomagnetic field survey mission is executed;

Getting a measuring error model along the flight path using the attitude measuring error obtained by the airborne console when the aircraft flies as per the preset attitude;

Getting the estimation of the geomagnetic field data collected over the flight path in a geographic coordinate frame using the dynamic model and the measuring error model.

Preferably, the method also comprises the steps of selecting a plurality of observation points in the area to be tested, collecting the geomagnetic field data of the plurality of observation points using a mobile earth station, and estimating the local geomagnetic field model parameters in the area to be tested using the geomagnetic field data of the plurality of observation points, wherein the geomagnetic field data includes the geomagnetic field total and vector, and the model parameters include the DC component parameter of the local geomagnetic field model and a plurality of harmonic component parameters.

Preferably, the plurality of observation points are distributed on one baseline which is a straight line with the length of L and original at the reference point $x_0$, and the baseline coincides with the direction of magnetic north.

Preferably, the geomagnetic field data collected by the airborne console on the flight path is decomposed using the local geomagnetic field model parameters to get the DC component and harmonic components in each direction, and the harmonic components in each direction are discretized to get the dynamic model over the flight path.

Preferably, the airborne console obtains the attitude measuring error through the positioning and orientation system.

Preferably, the method comprises the steps of getting a Kalman filter in the geographic coordinate frame using the dynamic model and the measuring error model, and getting the estimation of the geomagnetic field data collected over the flight path through the Kalman filter.

Preferably, the method also comprises the step of detecting the geomagnetic field for abnormality using the data stream in the Kalman filter.

Provided is an air-ground integrated geomagnetic field combined observation system according to another aspect of the invention, comprising:

A mobile earth station, used for validating local geomagnetic field model parameters using the geomagnetic field data collected by the mobile earth station before the geomagnetic field survey mission is executed;

An airborne console, used for getting the dynamic model along the flight path using the geomagnetic field data collected over the flight path and the model parameters when the geomagnetic field survey mission is executed; getting a measuring error model along the flight path using the attitude measuring error obtained when the aircraft flies as per the preset attitude; getting the estimation of the geomagnetic field data collected over the flight path in a geographic coordinate frame using the dynamic model and the measuring error model.

Preferably, the airborne console is used to get a Kalman filter in the geographic coordinate frame using the dynamic model and the measuring error model, and get the estimation of the geomagnetic field data collected over the flight path through the Kalman filter.

Preferably, the system also comprises:

A magnetic anomaly detector, used for detecting the geomagnetic field for abnormality using the data stream in the Kalman filter.

Compared with the prior art, the invention has the beneficial effects:

In the invention, the geomagnetic field measurement can be implemented directly facing the airborne platform in the air-ground integrated observation system combined with geophysics, avionics integration technology, magnetic sensor technology, digital signal processing technology, etc. The measurement data has high precision and can be used for earthquake prediction and mineral exploration analysis.

EMBODIMENTS OF THE INVENTION

The following is a detailed description of the preferred embodiments of the invention by illustrating the attached figures. It shall be noted that the preferred embodiments described below are only for explanation of the invention, but not limited to the invention.

The invention provides an air-ground integrated geomagnetic field combined observation system and corresponding data processing method.

(1) The provided air-ground integrated geomagnetic field combined observation system includes a mobile earth station (namely mobile base station) and an airborne console (namely airborne observation console or airborne measuring platform), wherein, the mobile earth station is used to validate the local geomagnetic field model parameters using the geomagnetic field data collected by the mobile earth station before the geomagnetic field survey mission is executed; the airborne console is used to get the dynamic model along the flight path using the geomagnetic field data collected over the flight path and the model parameters when the geomagnetic field survey mission is executed, get the measuring error model along the flight path using the attitude measuring error obtained when the aircraft flies as per the preset attitude, and get the estimation of the geomagnetic field data collected over the flight path in the geographic coordinate frame using the dynamic model and the measuring error model; specifically, the airborne console is used to get a Kalman filter in the geographic coordinate frame using the dynamic model and the measuring error model, and get the estimation of the geomagnetic field data collected over the flight path through the Kalman filter. Further, the system also comprises a magnetic anomaly detector, used for detecting the geomagnetic field for abnormality using the data stream in the Kalman filter. The magnetic anomaly detector can be arranged in the mobile earth station or the airborne console.

The airborne observation console includes an optically pumped cesium magnetometer, a tri-axial fluxgate magnetometer, an airborne positioning and orientation system (POS) and a integrated mission processing unit. The optically pumped cesium magnetometer is used to measure the total value of the geomagnetic field, and the tri-axial fluxgate magnetometer is used to measure three components of the geomagnetic field in the body frame, and both of them are installed in magnetic-free tail stingers. The airborne observation console is used to collect the geomagnetic field vector and total measurement data over the flight path, provide the estimation of the geomagnetic field vector in the geographic coordinate frame by adopting the model and algorithm given in (4) and (6), and the same time detect the geomagnetic anomaly possibly occurred using the data obtained with the algorithm.

The base station is mobile, used for modeling data processing unit and post-flight data processing, and arranged the center of the mission area generally. A magnetic sensor the same as the airborne observation console is installed on a single-axis magnetic-free platform, used for preflight data sampling to establish the local geomagnetic field model and identify the model parameters by adopting the model and algorithm given in (2) and (6).

(2) The local geomagnetic field model provided in the reference [2] is described using quasi-ARMA process with DC component, and the local geomagnetic field model parameters can be identified, namely that the model parameters are identified using the field data measured by the mobile earth station before the geomagnetic field survey mission is executed.

(3) The aircraft flies along the preset straight line and collects the magnetic field vector and total on the way points. The data is processed and stored through the integrated mission processing unit 4 on the airborne observation console.

(4) The measurements obtained through the airborne sensor are decomposed into the DC component and harmonic components using the local geomagnetic field model parameters obtained in (2); the harmonic components in each direction are represented with state equations; after discretization, a recursive local geomagnetic field dynamic model over the flight path is proposed, and designed with an estimator. The aircraft is assumed to move at a constant speed over a horizontal plane with preplanned heading; after the measuring error of an attitude sensor is taken into account, a measuring error model (namely an observation model) is presented under the configuration of the above sensor.

(5) In order to smoothen the attitude sensor noise, considering that the data rate of attitude output is much stronger than that of a magnetic sensor, a simple α-attitude filter (expression (17)) is also provided, used for improving the attitude measurement accuracy.

(6) An extended Kalman filter (EKF) is designed; the estimation of the geomagnetic field intensity vector represented under a unified geographic coordinate frame is provided for the total-field output from the optically pumped cesium magnetometer at the measuring point in (1) and three components of the geomagnetic field output from the fluxgate magnetometer in the body frame at the measuring point by using the geomagnetic field model parameters identified in (2), the dynamic geomagnetic model and observation model given in (4) and the attitude filter output given in (5).

(7) The filter initial conditions in (6), system noise covariance matrix and measurement noise covariance matrix are determined.

Figure 1:
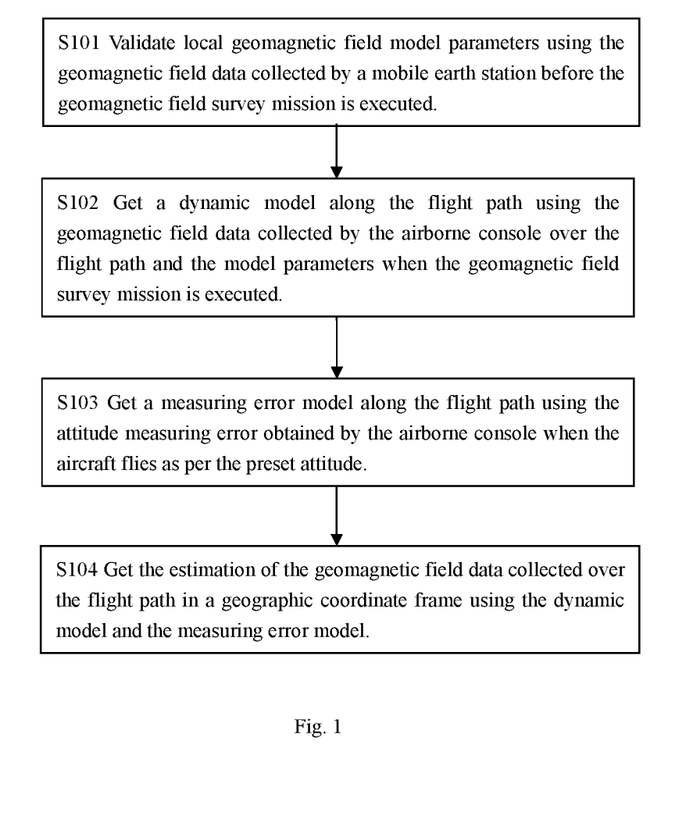
FIG. 1 is a functional block diagram of the air-ground integrated geomagnetic field combined observation method provided by the embodiment in the invention.

FIG. 1 is a functional block diagram of the air-ground integrated geomagnetic field combined observation method provided by the embodiment in the invention, comprising;

S101 Validate local geomagnetic field model parameters using the geomagnetic field data collected by a mobile earth station before the geomagnetic field survey mission is executed.

Specifically, select a plurality of observation points in the area to be tested, collecting the geomagnetic field data of the plurality of observation points using a mobile earth station, and estimating the local geomagnetic field model parameters in the area to be tested using the geomagnetic field data of the plurality of observation points, wherein the geomagnetic field data includes the total-field and vector component, and the model parameters include the parameters of the DC component ($c$ in expression (2)) of the local geomagnetic field model and a plurality of harmonic component ($a_1 \ldots a_k$ in expression (3)). Wherein, the plurality of observation points are distributed on one baseline which is a straight line with the length of L and original the reference point $x_0$, and the baseline coincides with the direction of magnetic north.

S102 Get a dynamic model along the flight path using the geomagnetic field data collected by the airborne console over the flight path and the model parameters when the geomagnetic field survey mission is executed. Getting the DC component and harmonic components in each direction using the local geomagnetic field model parameters to decompose the geomagnetic field data collected by the airborne console on the flight path, and get the dynamic model (expression (11)) over the flight path through discretizing the harmonic components in each direction.

S103 Get a measuring error model along the flight path using the attitude measuring error obtained by the airborne console when the aircraft flies as per the preset attitude (expression (16)). Wherein, the airborne console obtains the attitude measuring error through the positioning and orientation system.

S104 Get the estimation of the geomagnetic field data collected over the flight path in a geographic coordinate frame using the dynamic model and the measuring error model (expression (18)).

Specifically, get the Kalman filter in the geographic coordinate frame using the dynamic model and the measuring error model, and get the estimation of the geomagnetic field data collected over the flight path through the Kalman filter.

Further, detect the geomagnetic field for abnormality using the data stream in the Kalman filter. $y_k - h_1(\hat{x}_{k+1|k})$.

Figure 2:
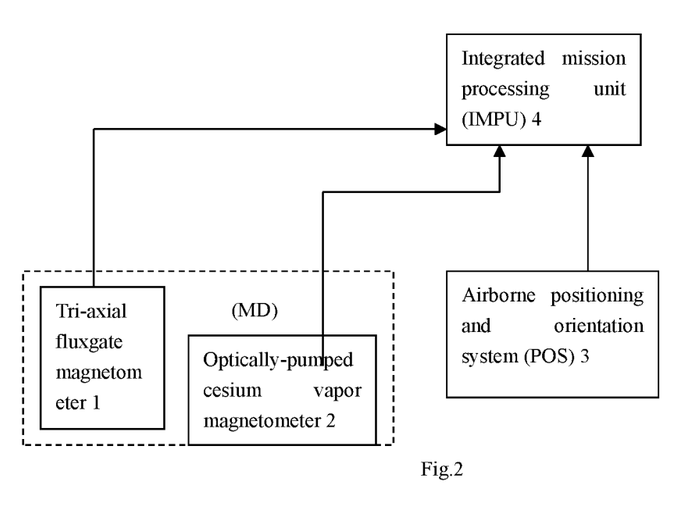
FIG. 2 is a block diagram of components of the airborne console provided by the embodiment in the invention.

FIG. 2 is a block diagram of components of the airborne console provided by the embodiment in the invention; as shown in FIG. 2, the mission of the airborne observation console is one of magnetic field surveillance over a rectangular area approximately 3000 km×1000 km centered at the base station, at a height above ground between 300 m to 1000 m with safe clearance that is determined by local terrain.

FIG. 2 illustrates the components of the airborne geomagnetic observation console. Both the tri-axis fluxgate magnetometer 1 and the optically-pumped cesium vapor magnetometer 2 are installed at the far end of a magnetic-free tail-stinger. It is as long as possible in order to avoid significant aerodynamic variance of the aircraft, and, as a cantilever beam, (its banding and torsion deformations, dependent on its material), at its far end, are at least an order smaller than the azimuth and the rolling angular errors, respectively. The fluxgate magnetometer 1 and the optically pumped cesium vapor magnetometer are all powered by airborne DC power supply via a twist wire arranged in the tail stinger and grounded at the first convenient point at the cockpit floor with a resistance less than 10Ω, to reduce the disturbance of the induced magnetic field by the current of the power wire.

The airborne positioning and orientation system (POS) 3, a commercial-on-shelf product and installed within the aircraft's equipment compartment, is used to provide the position and attitude represented in the body frame; the sampling time adopts UTC (universal coordinated time) as standard.

An airborne integrated mission processing unit 4, together with a monitor installed within the aircraft's operator cockpit, is used to process, store and display the measured magnetic field data and the flight parameters of the aircraft. The airborne integrated mission processing unit 4 has properly designed human-machine interfaces, so the collected observation data can be operated and viewed in real time. The main processing missions of the airborne integrated mission processing unit 4 include: 1) implementing the geomagnetic field estimation provided by the invention (expression (11)~expression (19)) and magnetic anomaly detection (expression (20)); 2) aircraft magnetic environment compensation algorithm; 3) geomagnetic daily variation compensation algorithm.

Figure 3:
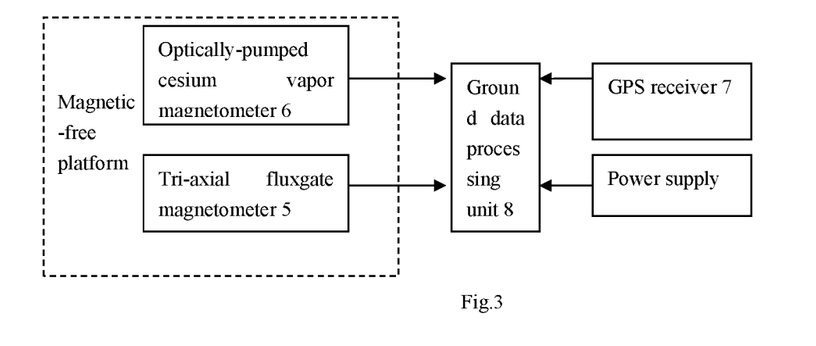
FIG. 3 is a block diagram of components of the mobile earth station provided by the embodiment in the invention.

FIG. 3 is a block diagram of components of the mobile earth station provided by the embodiment in the invention; as shown in FIG. 3, the base station works with the airborne observation console for the purposes of geomagnetic variance monitoring and data processing. The base station can also work independently to survey the local geomagnetic field. The tri-axis fluxgate magnetometer 5 and the optically-pumped cesium vapor magnetometer 6 are installed on an magnetic-free platform, which can be leveled manually. The orientation of the platform is of as the same accuracy as POS. A difference GPS (DGPS) receiver 7 is placed on the platform to provide the position of the base station and time of sampling. A ground data processing unit 8 consisting of an industry control computer and a monitor, is used for off-line data storage, management and processing, such as solar diurnal variance monitoring, data filtering, parameter identification and local geomagnetic field model validation.

I. For a given survey area, which is assumed at suburban, a semi-empirical local geomagnetic model is established by the following experimental method. To avoid the diurnal variation of the geomagnetic field caused by the solar radiation, the experiment is suggested to be conducted at mid-night.

1. Choose a straight line, original at the reference point $x_0$, as the baseline 1 coinciding with the direction of magnetic north, with a length, denoted by L, from 2 km to a few kilometers. Along the baseline, an even number, say M≥2 of survey points, $x1, \ldots, x_M$, with an equal interval $\Delta l$, being determined with the DGPS receiver. At each point $x_i$, the geomagnetic field is measured N (typically N=100) times. Take the average values as the input of the processing model.

$$\bar{B}_x(x_i) = \frac{1}{N}\sum_{n=1}^{N} B_{xn}(x_{im})$$

$$\bar{B}_z(x_m) = \frac{1}{N}\sum_{n=1}^{N} B_{zn}(x_m)$$

where, $B_{xn}(x_m)$, $B_{zn}(x_i)$ are the nth measures of the geomagnetic field acquired at the point $x_i$ by a properly leveled tri-axis fluxgate magnetometer, $n=1, \ldots N$, $m=1, \ldots M$.

2. Since the geomagnetic field can be decomposed as a sum of a constant with a number of harmonic components ([2]), the expressions $\bar{B}_j(x_i)$ have the same form.

$$\bar{B}_j(x_i)=c_j+s_j(i)+v_j, j=x,y,z$$

$c_j$ are the constants to be determined, $v_j$ are the measurement noises, of nonzero-mean and covariance $\sigma_{vj}$ is determined by the magnetic sensor noise and number of samples at the current point:

$$\sigma_{vj} = \frac{\sigma_{sensorj}}{\sqrt{N}}$$

At each axis, the harmonic component is approximated by an AR (auto-regression) model with coefficients to be determined.

$$s_j(i)=a_{1j}s_j(i-1)+ \ldots +i\, a_{K_j}s_i(i-K_j)$$

where $K_j \leq M-1$ are even numbers, j=x, y, z whose eigen-polynomials:

$$1-a_{1j}\lambda^{-1}- \ldots -a_{Kj}\lambda^{-Kj}=0 \quad (1)$$

have roots $e^{\pm i\omega_{nj}\Delta l}$, $n=1, 2, \ldots K_j/2$, j=x, z. on the unit circle of the complex plane, with $\omega_{nj}$ representing the spatial periodic properties, where $\Delta l$ is the sampling interval.

To make the documentation clear, a procedure is developed to identifying parameters of the models as follows $$u(k)=c+s(k)+v_n(k) \quad (2)$$

$$s(k)=a_1 s(k-1)+ \ldots +a_K s(k-K) \quad (3)$$

where, $k=1, \ldots M$; $M \geq K+1$; $K \geq 2$ is an even integer, $v_n$ is white Gaussian noise. The purpose of this procedure is to provide the estimates for a constant c and coefficients in (2) and (3). The philosophy behind the procedure is documented in the subsequent "parameter identification for local geomagnetic field".

$$u=[u(i),u(i+1), \ldots u(i+M)]^T$$

$$p=[q,a_1, \ldots a_K]^T$$

are measurement vector and parameter vector to be identified, respectively, where the superscript T denotes transpose of a vector, and $q=c(1-a_1- \ldots -a_K)$. The data are used to form the following normal matrix equation:

$$u = A_m p \quad (4)$$

$$A_m = \begin{bmatrix} 1 & u(k-1) & \ldots & u(k-K) \\ 1 & u(k) & \ldots & u(k+1-K) \\ \vdots & \ldots & \ldots & \vdots \\ 1 & u(M) & \ldots & u(M-K) \end{bmatrix}$$

resulting in the following least square solution:

$$\hat{p}=(A_m^T A_m)^{-1}A^T u \quad (5)$$

The estimate of the constant c in (2) is given by $$\hat{c}=\hat{p}_1(1-\hat{p}_2- \ldots \hat{p}_K) \quad (6)$$

Finally, substituting for $\bar{B}_j(x_m)$, j=x, z, the trains of locally measured geomagnetic fields, into the afore-documented procedure returns the required parameters $\hat{a}_{jk}$ and $\hat{c}_j$ in each fluxgate channel. Use the identified local geomagnetic model representation $\bar{B}_j(x_m)$, j=x, y, z. The parameters in the geomagnetic model are stored in the integrated mission processing unit 4 and bound to the data processing programs. In particular, $$\hat{A}=\hat{c}_x, \hat{C}=\hat{c}_z \quad (7)$$

During the geomagnetic survey, the aircraft is required to fly at a speed $v_g$ over a horizon plane with preplanned heading $\varphi$. The mission process unit 4 polls on the magnetometers at 10 Hz, and on the POS as fast as possible, all through RS-232 serial interfaces. Two procedures designed but not disclosed here, are employed to compensate the magnetic field environment and the solar diurnal variation.

A local geomagnetic dynamic model is formed for on-line data processing, which is documented as follows.

The aircraft is assumed to fly at a constant speed $v_g$ along a straight line, of nominal heading $\varphi$ related to local magnetic north. For output of each channel of fluxgate, adopt the marks in (A7) in the subsequent "parameter identification for local geomagnetic field", namely the three fluxgate channels of DC constants are $c_x^\varphi$, $c_y^\varphi$ and $c_z$. $\hat{c}_x^\varphi = \hat{A}_{cos\ \varphi}$, $\hat{c}_y^\varphi = \hat{A}_{sin\ \varphi.A}$ and $c_z$ are identified in (7) Denote the harmonic components for each channel of the fluxgate magnetometer by $s_x = B_{bx} - c_x^\varphi$, $s_y = B_{by} - c_y^\varphi$ and $s_z = B_{bz} - c_z$.

In particular, in a geographic frame whose orientation at the mass center of the vehicle, with a heading, apart form that originated at the ground station, the harmonic components is of the following form, $$s_x(k) = -\sum_{i=1}^{K_x/2} D_i v \exp(uz) v \cos(v(x_0 + kv_g \Delta t)) \approx \tag{8}$$
$$\hat{a}_{x1}^\varphi s_x(k-1) + \ldots + \hat{a}_{xK_x}^\varphi s_x(k-K_x)$$

$$s_y(k) = \sum_{i=1}^{K_y/2} \exp(uz) v(E' \sin(2v(x_0 + kv_g \Delta t)) + G'_j \cos(v(x_0 + kv_g \Delta t))) \approx$$
$$\hat{a}_{x1}^\varphi ss_y(k-1) + \ldots + \hat{a}_{xK_y}^\varphi s_y(k-K_y)$$

-continued $$s_z(k) = \sum_{i=1}^{K_z/2} F_i v \exp(\omega_z z) v \cos(v(x_0 + kv_g \Delta t)) \approx$$
$$\hat{a}_{z1} s_x(k-1) + \ldots + \hat{a}_{zK} s_x(k-K_z)$$
$$k = 0, 1, 2,$$

after discretization, where $\max(K_x, K_y) \leq K$, $\Delta t$ is is the time of sampling. Without loss of generality, set $x_0 = 0$, $\omega = v$, $\Delta l = v_g \Delta t$, the coefficients, $j = x, y$, $\hat{a}_{jt}$ and $\hat{c}_j$ are determined in (7) (refer to the subsequent "parameter identification for local geomagnetic field").

$$\prod_{k=-K_x/2}^{K_x/2} (\lambda - e^{k\omega\cos\varphi\Delta t}) = \lambda^{K_x} - (\hat{a}_{x1}^\varphi \lambda^{K_x - 1} + \ldots \hat{a}_{xK}^\varphi) = 0, \tag{9}$$

$$\prod_{k=-K_y/2}^{K_y/2} (\lambda - e^{kv\sin\varphi\Delta t}) = \lambda^{K_x} - (\hat{a}_{y1}^\varphi \lambda^{K_x - 1} + \ldots \hat{a}_{yK_y}^\varphi) = 0,$$

Then define a state vector $$x_k = [c_x^\varphi, c_y^\varphi, c_z, s_x(k-K_x), \ldots, s_x(k), s_y(k-K_y), \ldots,$$
$$s_y(k-), s_y(k), s_z(k-z), \ldots, s_z(k)]^T$$

of length $N_s = 3 + K_x + K_y + K_z$, and construct the state transient equation of the $$x_k = \Phi x_k + B_w w_k, k = 0, 1, 2 \tag{10}$$

where, w is the vector representing the residuals due to the AR model truncation error $\Phi_{Ns \times Ns}$:

$$\Phi = \begin{bmatrix} I_{3\times 3} & 0 & 0 & 0 & \ldots & 0 & 0 & 0 & \ldots & 0 & 0 & 0 & 0 & \ldots & 0 \\ 0 & 0 & 1 & 0 & \ldots & 0 & 0 & 0 & \ldots & 0 & 0 & 0 & 0 & \ldots & 0 \\ 0 & 0 & 0 & 1 & \ldots & 0 & 0 & 0 & \ldots & 0 & 0 & 0 & 0 & \ldots & 0 \\ \vdots & & & & \ldots & & & & & & & & & & \vdots \\ 0 & -1 & \hat{a}_{x1}^\varphi & \hat{a}_{x2}^\varphi & \ldots & \hat{a}_{xK_x}^\varphi & 0 & 0 & \ldots & 0 & 0 & 0 & 0 & \ldots & 0 \\ 0 & 0 & 0 & 0 & \ldots & 0 & 1 & 0 & \ldots & 0 & 0 & 0 & 0 & \ldots & 0 \\ 0 & 0 & 0 & 0 & \ldots & 0 & 0 & 1 & \ldots & 0 & 0 & 0 & 0 & \ldots & 0 \\ \vdots & & & & & & & & \ldots & & & & & & \vdots \\ 0 & 0 & 0 & 0 & 0 & -1 & \hat{a}_{y1}^\varphi & \hat{a}_{y2}^\varphi & \ldots & \hat{a}_{yK_y}^\varphi & 0 & 0 & 0 & \ldots & 0 \\ 0 & 0 & 0 & 0 & \ldots & 0 & 0 & 0 & \ldots & 0 & 1 & 0 & \ldots & 0 \\ 0 & 0 & 0 & 0 & 0 & 0 & 0 & 0 & \ldots & 0 & 0 & 0 & 1 & \ldots & 0 \\ \vdots & & & & & & & & & & & & \ldots & & \vdots \\ 0 & 0 & 0 & 0 & 0 & 0 & 0 & 0 & \ldots & 0 & -1 & \hat{a}_{z1} & \hat{a}_{z2} & \ldots & \hat{a}_{zK_z} \end{bmatrix} \tag{11}$$

$$B_w = \begin{bmatrix} 0 & 0 & 0 \\ \ldots \\ 1 & 0 & 0 \\ 0 & 0 & 0 \\ \ldots \\ 0 & 1 & 0 \\ 0 & 0 & 0 \\ \ldots \\ 0 & 0 & 1 \end{bmatrix}$$

$B_w$ is an $N_s \times 3$ real matrix, where the none-zero entities at the positions $(3+K_x, 1), (3+K_x+K_y, 2), (N_s, 3)$. the covariance matrix, Q, of the zero-mean process w, is assumed to be semi-positive definite.

For airborne console flying at the nominal heading $\varphi_0$, pitch $\theta_0$, $\gamma_0$, POS with independent attitude measuring errors $[\Delta\varphi, \Delta\theta, \Delta\gamma]$, the measurements are given by $y_k = [B_g + v_g, B + v_B]^T$, where $v_g$ is the white noise of matrix covariance of the form, and $v_B$ and is the measuring noise of the optically pumped cesium magnetometer $$R_{B_g} = E\{\Delta B_g \Delta B_g^T\} \quad (12)$$
$$= \text{diag}[\sigma_{bx}^2, \sigma_{by}^2, \sigma_{bz}^2] +$$
$$E\left\{C(B_{g0}, \phi_0, \theta_0, \lambda_0)\begin{bmatrix}\Delta\phi \\ \Delta\theta \\ \Delta\gamma\end{bmatrix}[\Delta\phi, \Delta\theta, \Delta\gamma]C^T(B_{g0}, \phi_0, \theta_0, \lambda_0)\right\}$$

where:

$$C(B_{b0}, \phi_0, \theta_0, \lambda_0) = \begin{bmatrix} -(B_{bx0}\sin\varphi_0 + B_{by0}\cos\varphi_0) & B_{bz0}\sin\varphi_0 & B_{bz0}\sin\varphi_0 \\ B_{bx0}\cos\varphi_0 - B_{by0}\sin\varphi_0 & -B_{by0}\cos\varphi_0 & B_{b0}\sin\varphi_0 \\ 0 & B_{by} & -B_{bx} \end{bmatrix} \quad (13)$$

$\sigma_{bx}^2$, $\sigma_{by}^2$ and $\sigma_{bz}^2$ are the variances of the fluxgate measuring noises at each channel. Derivation of these know-how is provided in the subsequent "noise covariance estimation".

The geomagnetic fields are measured in the body frame:

$$B_{bx} = x_1 - x_{3+k_z} x_{3+K_x}$$

$$B_{by} = x_2 + x_{3+K_x+K_y}$$

$$B_{bz} = x_3 + x_{3+K_x+K_y+K_z}$$

$A_b^g$ Denote by the attitude matrix that transform vectors in the body frame to the geographic frame (see noise covariance estimates), the measurements are given as follows:

$$y_k = \begin{bmatrix} A_b^g \begin{bmatrix} x_1(k) - x_{3+K_x}(k) \\ x_2(k) + x_{3+K_x}(k) \\ x_3(k) + x_{3+K_x+K_y+K_z}(k) \end{bmatrix} + v_g(k) \\ \sqrt{(x_1(k) - x_{3+K_x}(k))^2 + (x_2(k) + x_{3+K_x}(k))^2 + (x_3(k) + x_{3+K_x+K_y+K_z}(k))^2} + v_B(k) \end{bmatrix} \quad (14)$$

$$y(k) = \begin{bmatrix} H_1 x_k \\ \sqrt{(x_1(k) - x_{3+K_x}(k))^2 + (x_2(k) + x_{3+K_x}(k))^2 + (x_3(k) + x_{3+K_x+K_y+K_z}(k))^2} \end{bmatrix} + \begin{bmatrix} v_{gk} \\ v_{Bk} \end{bmatrix}$$

$$\equiv h_1(x_k) + v_{mk}$$

$$k = 0, 1, 2, \ldots ,$$

For the case the aircraft travels over a horizon plane, $$H_1 = \begin{bmatrix} \cos\hat{\phi} & -\sin\hat{\phi} & 0 & 0 & -\cos\hat{\phi} & 0 & 0 & \sin\hat{\phi} & 0 & 0 \\ \sin\hat{\phi} & \cos\hat{\phi} & 0 & 0 & \sin\hat{\phi} & 0 & 0 & \cos\hat{\phi} & 0 & 0 \\ 0 & 0 & 1 & 0 & 0 & 0 & 0 & 0 & 0 & 1 \end{bmatrix} \quad (15)$$

$v_{mk}$ is the covariance of the measurement noise vector denoted $R_y$, expressed as follows:

$$R_y = \begin{bmatrix} R_{B_g} & 0 \\ 0 & R_B \end{bmatrix} = \begin{bmatrix} R_{B_g} & 0 \\ 0 & E(v_B^2) \end{bmatrix} \quad (16)$$

Whilst the nominal pitch and rolling are zero, the nominal heading $\varphi_0$ cannot assumed to be known and needs to be estimated. Since, assumed constant heading $\varphi_0$ is of dynamics totally decoupled with the field model, and the numerical scale of its noise is so small in comparison with the magnetometers' noises, in this invention, it is estimated via the following simple pre-processing filter:

$$\hat{\varphi}_k = \alpha \hat{\varphi}_k + (1-\alpha)\hat{\varphi}_{measured,k} \, k = 0,1,2,\ldots , \quad (17)$$

where $\varphi_{measured}$ is the measured heading angle taken from the POS 3.

An Extended Kalman filter [7]) (EKF), is designed and implemented in the mission processing unit 4 to estimate the required geomagnetic field expressed in the geographic coordinate frame. The EKF is represented as follows:

$$\hat{x}_{k+1|k} = \Phi \hat{x}_{k|k} \quad (18)$$

$$P_{k+1|k} = \Phi P_{k|k} \Phi^T + B_w Q B_w^T$$

$$K_k = P_{k+1|k} \frac{\partial h_1^T(\hat{x}_{k+1|k})}{\partial x} \left( \frac{\partial h_1(\hat{x}_{k+1|k})}{\partial x} P_{k+1|k} \frac{\partial h_1^T(\hat{x}_{k+1|k})}{\partial x} + R_y \right)^{-1}$$

$$\hat{x}_{k+1|k+1} = \hat{x}_{k+1|k} K_k (y_k - h_1(\hat{x}_{k+1|k}))$$

$$P_{k+1|k+1} = \left( I - K_k \frac{\partial h_1(\hat{x}_{k+1|k})}{\partial x} \right) P_{k+1|k}$$

where $\hat{x}_{k+1|k+1}$ stands for the estimate of $x_{k+1}$, given the train of observes $\{y_i, i=0, 1, 2, \ldots, k+1\}$, $\hat{x}_{k+1|k}$ is the prediction of $x_{k+1}$, $y_k = y(k)$, $K_k$ is the gain of the filter, $P_{k+1|k}$ and $P_{k+1|k+1}$ are the covariance matrices of the estimated and predicted state, for $k=0, 1, 2, \ldots$. The linear observation function $h_1(x)$ adopts $\hat{x}_{k+1|k}$ for the one step prediction of the state.

Initial coordinate $P_0=P(0)$ and $\hat{x}_{1|0}=\hat{x}(0)$. The initial state covariance matrix may take the form, $P(0)=\beta I$, namely, an identity matrix multiplied by a large number $\beta$. The initial guess of the state vector is a little bit more complicated. The first three components are obtained as:

$$\begin{bmatrix} \hat{x}_1(0) \\ \hat{x}_2(0) \end{bmatrix} = \begin{bmatrix} \cos(\varphi_0+\phi) & -\sin(\varphi_0+\phi) \\ \sin(\varphi_0+\phi) & \cos(\varphi_0+\phi) \end{bmatrix} \begin{bmatrix} \hat{c}_x \\ \hat{c}_y \end{bmatrix} \quad (19)$$

$$\hat{x}_{3+K_x+1}(0) = y_1(1) - \hat{c}_y$$

$$\hat{x}_2(0) = \hat{c}_z$$

where, $\hat{c}_x$, $\hat{c}_y$, $\hat{c}_z$ are identified by the base station. The rest initial state vectors are guessed with the first K (max ($K_x$, $K_y$, $K_z$)) measured from the magnetometers as follows, $$\hat{x}_{3+1}(0)=\hat{c}_x-y_1(1)$$

$$\ldots,$$

$$\hat{x}_{3+K_x}(0)=\hat{c}_x-y_1(K_x),$$

$$\hat{x}_{3+K_x+1}(0)=y_2(1)-\hat{c}_y,$$

$$\ldots,$$

$$\hat{x}_{3+K_x+K_y}(0)=y_2(K_y)-\hat{c}_y,$$

$$\hat{x}_{3+K_x+K_y+1}(0)=y_3(1)-\hat{c}_z,$$

$$\ldots,$$

$$\hat{x}_{3+K_x+K_y+K_z}(0)=y_3(K_z)-\hat{c}_z.$$

The process noise covariance matrix Q is carefully chosen from a 3×3 diagonal matrix, whose entities are not smaller than 0.01 nT.

This invention also comprises a magnetic anomaly detector (MAD), which is implemented either on the integrated mission processing unit 4 or the data processing unit 8 in the base station. The MAD is used to report possible geomagnetic anomalies making use of statistics constructed from the sequences of the innovations obtained from the EKF. The terminology innovation here is used to denote the data stream $y_k-h_1(\hat{x}_{k+1|k})$ in EKF, which is unbiased if the model is valid. Therefore, the hypothesis for each measuring channel is as follows.

H0$_j$: there is no field anomaly in direction j,
H1$_j$: there is no field anomaly in direction j.

For the cases of large number $N_{sample}$ of samples, for instance, $N_{sample}>100$, and given level failure probability $\varepsilon$, namely the probability that the anomaly happens but the detector fails to report, t-distribution detectors are of the following form:

$$|\bar{y}_j(k)/\hat{\sigma}_j(k)| \leq t_\varepsilon \; j=1,2,3. \; k=N_{max}, N_{max}+1, \ldots, \quad (20)$$

it is considered that H0$_j$ is true, the geomagnetic field intensity corresponding to this component has no anomaly, where $$\bar{y}_j(k)=\Sigma_{i=1}^{N_{sample}} y_j(k-i-1)/N_{sample}$$

the estimates of the variance are given:

$$\hat{\sigma}_j(k)=\sqrt{\Sigma_{i=1}^{N_{sample}}(y_j(k-i-1)-\bar{y}_j(k))^2/(N_{sample}-1)}$$

and for given level failure probability $\varepsilon$, the threshold $t_\varepsilon$ can be looked up from the table of t-distribution in [6] from mathematic handbooks.

The filtered data, sensor data, sampling time, aircraft position and attitude are stored in a file of the integrated mission processing unit 4 with pre-specified format. The data file, after down-loaded from 4, are submitted to entitled authorities to make decisions and publish potential quake forecast according to their data analysis.

II. Parameter Identification for Local Geomagnetic Field

As it is well known, a number of models do exist for describing the geomagnetic field, either globally or at large area, such as the IGRF([1]), WMM([1]), and CHINAMF ([4]). However, for airborne survey applications, the interesting area may not be that large, and these models are not accurate enough for quake induced magnetic anomalies detection. Therefore, a local model for the field description seems appropriated. This model is established according to the hypothesis of dipole geomagnetic field, composed of spherical harmonic functions, with high accuracy, and it can be used for the local geomagnetic field modeling in the invention. In the invention, the geomagnetic anomalies caused by rays from out-space, such as solar storms, are not considered.

In a geographic frame centered at a local point of interest, the magnetic potential of the geomagnetic field is a solution for a Laplacian equation and is written as [2]:

$$U = -Ax - By - Cz - \quad (A1)$$

$$\sum_{q_1=1}^{N_{max}-1} \sum_{i=1}^{q_1} \{D_{ij}\cos(ivx)\cos(jwy) + E_{ij}\cos(ivx)\sin(jwy) +$$

$$F_{ij}\sin(ivx)\sin(jwy) + G_{ij}\sin(ivx)\cos(jwy)\}\exp(u_1 z)$$

$$j = q - i + 1, \; v = 2\pi/L_x, \; w = 2\pi/L_y, \; u_1 = [(iv)2 + (jw)2]^{1/2}$$

where U is the potential of the local geomagnetic field, where $L_x$ and $L_x$ are the lengths of the interested rectangular area, A, B and C are constants; $D_{ij}$, $E_{ij}$, $F_{ij}$, and $G_{ij}$ are coefficients.

Then in this geographic coordinate frame, the geomagnetic measurement is obtained as follows $$B_g = -\mu_0 \nabla U \quad (A2)$$

where $\mu_0 = 4\pi \times 10^{-7}$ H/m is the electric medium constant of air, and $\nabla$ is the gradient operator in a predefined geographical frame, $$B_g = \begin{bmatrix} A + \sum_{q_1=1}^{N_{max}-1}\sum_{i=1}^{q_1} iv\{-D_{ij}\sin(ivx)\cos(jwy) - E_{ij}\sin(ivx)\sin(jwy) + \\ F_{ij}\cos(ivx)\sin(jwy) + G_{ij}\cos(ivx)\cos(jwy)\}\exp(u_1 z) \\ B + \sum_{q_1=1}^{N_{max}-1}\sum_{i=1}^{q_1} jw\{D_{ij}\cos(ivx)\sin(jwy) - E_{ij}\cos(ivx)\cos(jwy) - \\ F_{ij}\sin(ivx)\cos(jwy) + G_{ij}\sin(ivx)\sin(jwy)\}\exp(u_1 z) \\ C + \sum_{q_1=1}^{N_{max}-1}\sum_{i=1}^{q_1} u_1\{D_{ij}\cos(ivx)\cos(jwy) + E_{ij}\cos(ivx)\sin(jwy) + \\ F_{ij}\sin(ivx)\sin(jwy) + G_{ij}\sin(ivx)\cos(jwy)\}\exp(u_1 z) \end{bmatrix} \quad (A3)$$

the expression (A3) is valid for any locally inertial coordinate frame. In particular, if $O_x$ coincides with the baseline L, $O_y$ axis is orthogonal to $O_x$, the expression (A3) is reduced to:

$$B_g = \begin{bmatrix} A + \sum_{q=1}^{N_{max}-1} \sum_{i=1}^{q} iv\{-D_{ij}\sin(ivx) - E_{ij}\cos(ivx)\}\exp(vz) \\ \sum_{q=1}^{N_{max}-1} \sum_{i=1}^{q} jw\{E_{ij}\cos(ivx) + F_{ij}\sin(ivx)\}\exp(u_1 z) \\ C + \sum_{q=1}^{N_{max}-1} \sum_{i=1}^{q} u_1\{D_{ij}\cos(ivx) + G_{ij}\sin(ivx)\}\exp(vz) \end{bmatrix} \quad (A4)$$

Expression (A4) indicates that the geomagnetic field is locally decomposed into a sum of a series of harmonic components with unknown 'frequencies and coefficients. For the spatial 'frequencies', two observations are instructive.

First, it follows from elementary trigonometry that (A4) can be rewritten as the following more compact form $$B_{gl} = \begin{bmatrix} A - \sum_{q=1}^{N_{max}-1} \sum_{i=1}^{q} \sum_{q=1}^{N_{max}-1} ivA_{xij}\cos(ivx + \phi_{ij}) \\ \sum_{q=1}^{N_{max}-1} \sum_{i=1}^{q} jwA_{yij}\cos(ivx + \varphi_{ij}) \\ C + \sum_{q=1}^{N_{max}-1} \sum_{i=1}^{q} u_1 A_{zij}\cos(ivx + \psi_{ij}) \end{bmatrix} \quad (A5)$$

For cases that $z \neq 0$, new coefficients $D_{ij}$ and $G_{ij}$ in (A4) can be renewed by multiplying themselves with the exponential factors $e^{ivz}$, $i=0, 1, \ldots 2$, while the amplitude and phase of the harmonic components all depend on the height of the base station. This manipulation does not change the frequency structure of (A5).

Second, for any geographical frame Ox'y'z', with the same vertical direction and of different heading φ, in the light of differential geometry.

$$\begin{bmatrix} \frac{\partial}{\partial x'} \\ \frac{\partial}{\partial y'} \\ \frac{\partial}{\partial z'} \end{bmatrix} = \begin{bmatrix} \cos\phi & -\sin\phi & 0 \\ \sin\phi & \cos\phi & 0 \\ 0 & 0 & 1 \end{bmatrix} \begin{bmatrix} \frac{\partial}{\partial x} \\ \frac{\partial}{\partial y} \\ \frac{\partial}{\partial z} \end{bmatrix} \quad (A6)$$

It is further claimed that, along the new direction, the base frequency v, in the expression (A4), is independent of the specific coordinate frame, remain unchanged. Consequently, once the 'frequencies of the harmonic components are identified, the expression (A5) or A(6), also applies to geomagnetic field at different height.

The number of terms within the summations in (A4) accounts to $1+2+\ldots N_{max}-1=(N_{max}-1)N_{max}/2$, which may be large. To make the problem numerically well-defined, even numbers $K_j$, j=x, y, z, are chosen within the range of 2 to $(N_{max}-1) N_{max}/2$ in practice, to limit the length of AR model of each fluxgate channel. This truncation leads to small modeling residuals, therefore trade-off between acceptable model accurate and numerical tractability is necessary.

It is routine to check ([4]) that a signal consisting of a number K, of different tunes of the form $$s(k) = b_1\cos(\omega k \Delta l + \varphi_1) + \ldots + b_{K/2}\cos\left(\frac{K}{2}\omega\Delta l + \varphi_{K/2}\right) \quad (A6)$$

with invariant phases, solves for the following equation.

$$s(k)=a_1 s(i-1)+ \ldots +a_K s(k-K) \quad k=1, \ldots, M, M \geq K+1 \quad (A7)$$

where the associated eigen-polynomial $$1-a_1\lambda^{-1}- \ldots -a_K\lambda^{-K}=0 \quad (A9)$$

has roots $e^{(i\omega_{n,j}\Delta l)}$, n=1, 2 . . . $K_j/2$, j=x, y, z, on the unit circle of the complex plane, representing the 'frequencies' of each harmonic component. Note that the polynomial has no real root, it follows that $$1-a_1- \ldots -a_K \neq 0 \quad (A10)$$

However, the expressions in Eqn. (A5) is not of the from of (A7). Instead, they can be unified in the following noise-contaminated form with unknown constant $$u(i)=c+s(i)+v_n(i) \quad (A11)$$

Where $v_n(i)$ denotes the sensor noise. In particular, the harmonic components s(i) cannot be separated from the measurements.

In the line of signal processing, the samples are usually sufficiently large to cover one period, so that the DC component c can be easily filtered out. As a consequence, most, if not all, techniques for frequency estimation, assume no DC components in signals. However, in current case, the length of the baseline is far shorter than the characteristic length $L_x$ and $L_x$ of the interested rectangular area, which usually take value range from a few hundred to one thousand kilometers ([1]), the constant in (A11) can not be filtered, nor can it be separated. Therefore, the challenge lies in one of using relatively small number of samples taken from over a short baseline to estimate the unknown constant and the coefficients, which distinguishes this invention significantly from the prior art.

To deal with the troublesome issue, a procedure is designed as follows. Note that $$u(k) = c + s(k) + v_n(k) \quad (A12)$$
$$a_1 u(k-1) = a_1 c + a_1 s(k-1) + a_1 v_n(k-1)$$
$$\vdots$$
$$a_K u(k-K) = a_K c + a_K s(k-K) + a_K v_n(k-K)$$

Taking into account Eqn. (A7), it follows that $$u(k)-a_1 u(k-1)- \ldots -a_K u(k-K)=c(1-a_1- \ldots -a_K)+ \\ (v_n(k)-a_1 v_n(k-1)- \ldots -a_K v_n(k-K)), k=1, \ldots \\ M, M \geq K+1 \quad (A13)$$

Let $$q=c(1-a_1- \ldots -a_K)$$

$$u=[u(k), u(k+1), \ldots u(k+M)]^T$$

$$p=[q, a_1, \ldots a_K]^T$$

resulting in equation and algorithm (4)~(6). Note that the number of equations in (A13) needs to be at least K+1, since the parameters to be identified more than the ordinary AR process by one.

Similar to arguments in ([4]), it is claimed that if the sensor noise is additive white Gaussian, the least squares estimator generates an optimal estimates of $\hat{p}$ in the sense that the covariance of the error.

$$E(e^2)=E((a_1-\hat{a}_1)u(k-1)+ \ldots +(a_K-\hat{a}_{K/2})u(k-K)-(q-\hat{q}))^2) \quad (A14)$$

III. Noise Covariance Evaluation

It is well-known for aircraft with heading $\varphi$, pitch $\theta$ and rolling $\gamma$, the coordinate transformation matrix from the body frame to the geographic frame is given:

$$A_b^g = \begin{bmatrix} \cos\gamma\cos\phi - \sin\gamma\sin\phi\sin\theta & -\sin\phi\cos\theta & \cos\phi\sin\gamma + \sin\phi\sin\theta\cos\gamma \\ \cos\gamma\sin\phi + \sin\gamma\cos\phi\sin\theta & \cos\phi\cos\theta & \sin\gamma\sin\phi - \cos\phi\sin\theta\cos\gamma \\ -\cos\theta\sin\gamma & \sin\theta & \cos\theta\cos\gamma \end{bmatrix} \quad (B1)$$

The field measured in the body frame is then represented in the geographic frame as follows, $$B_g = A_b^g B_b \quad (B2)$$

Taking into account the noises in the attitude measurements, denoted by $\varphi_0, \theta_0, \gamma_0$ represent the current values $\Delta\varphi, \Delta\theta$ and $\Delta\gamma$ represent the measuring noises. Also the field itself, measuring in the body frame, is noisy and can be represented as $$B_b = B_{b0} + \Delta B_b$$

Therefore the composed error of the field in the geographic frame reads $$\Delta B_g \approx A_b^g \Delta B_b + \Delta A_b^g B_{b0} \quad (B3)$$

where the error terms of orders higher than second have been ignored, and $\Delta A_b^g$ is the perturbation resulted from the attitude measurement noises. Analytical expression of the attitude perturbation could be obtained via differentiating the matrix element-by-element, and could be used to evaluate how the attitude deviations contribute to the total field errors. In general, these manipulations are elementary and cumbersome, and the expression is over-lengthy. Ignoring the terms of orders higher than the first, the second term at the right hand of Eqn. (3) can be written as follows $$\Delta A_b^g B_{n0} = C(B_{b0}, \phi_0, \theta_0, \lambda_0) \begin{bmatrix} \Delta\phi \\ \Delta\theta \\ \Delta\gamma \end{bmatrix} \quad (B4)$$

Further, for the case that the aircraft travels in an horizon plane at given azimuth, the pitch and rolling, $\theta$ and $\gamma$ are both small, sine $\theta$ and sin $\gamma$ can be approximated to $\theta$ and $\gamma$, and reduced to:

$$C(B_{b0}, \phi_0, \theta_0, \lambda_0) = \begin{bmatrix} -(B_{bx0}\sin\varphi_0 + B_{by0}\cos\varphi_0) & B_{bz0}\sin\varphi_0 & B_{bz0}\sin\varphi_0 \\ B_{bx0}\cos\varphi_0 - B_{by0}\sin\varphi_0 & -B_{by0}\cos\varphi_0 & B_{b0}\sin\varphi_0 \\ 0 & B_{by} & -B_{bx} \end{bmatrix} \quad (B5)$$

It follows from Eqns. (3) and (4) that the total field error Bb is Gaussian. if the sensor noises and the angular errors are Gaussian, which is assumed throughout this work. Note that the sensor noises are independent of the attitude error, and the covariance matrix of the total error after the coordinate transformation is given by:

$$R_{B_g} = E\{\Delta B_g \Delta B_g^T\} = \mathrm{diag}[\sigma_{bx}^2, \sigma_{by}^2, \sigma_{bz}^2] + + E \quad (B6)$$

$$\left\{ C(B_{g0}, \phi_0, \theta_0, \lambda_0) \begin{bmatrix} \Delta\phi \\ \Delta\theta \\ \Delta\gamma \end{bmatrix} [\Delta\phi, \Delta\theta, \Delta\gamma] C^T(B_{g0}, \phi_0, \theta_0, \lambda_0) \right\}$$

Note that the second term in the right hand of (6), which is free of coordinate transformation.

The invention provides an air-ground integrated geomagnetic field observation system for geomagnetic observation at the middle latitude region, composed of an airborne console and a mobile earth station. First, a local geomagnetic field model is established through quasi-autoregressive (AR) process using geomagnetic field data collected by the mobile earth station, and the model parameters are identified; then, a geomagnetic field recursive dynamic model along the flight path is established in the airborne mission processing unit using the local geomagnetic field model parameters identified by the base station; next, a measuring error model along the flight path is established according to the sensor configuration of the airborne console and the attitude sensor error; finally, an extended Kalman filter algorithm executed in the airborne mission processing unit is designed in combination with the above dynamical model and the measuring error model, the measuring accuracy of the geomagnetic field vector expressed in the geographic coordinate frame can be improved, and the innovation can also be used for detection of the geomagnetic field anomaly.

1. In the invention, the base station moving the baseline collinear with the projection of the magnetic flux on the horizontal plane is used to collect the local magnetic field intensity vector and total-field data, and identify a local magnetic field quasi-AR model of proper orders using the collected data.

2. The extended Kalman filter (EKF) provided by the invention uses the data collected by the airborne optically pumped magnetometer and the tri-axial fluxgate magnetometer to construct the geomagnetic field dynamical model along the preset flight path using the local magnetic field model parameters identified in 1, and estimate the geomagnetic field state represented in the geographic coordinate frame predefined properly from the attitude measurement noise and the sensor noise.

3. In the invention, the high-accuracy geomagnetic field observation data can be output.

4. In the invention, the possible magnetic anomaly is detected by a magnetic anomaly detector.

The above content is the detailed description of the invention, but not limited to it; the technicians in this technology field can make modifications according to the principles of the invention. Therefore, it shall be noted that all modifications made according to the principles of the invention shall be in the protection range of the invention.

The invention claimed is:

1. An air-ground integrated geomagnetic field combined observation method comprising:
   validating local geomagnetic field model parameters using geomagnetic field data collected by a mobile earth station before an airborne geomagnetic field survey mission is executed by an aircraft hosting a console and a magnetic-free tail stinger including a plurality of magnetometers, wherein the console includes the magnetometers;

getting a geomagnetic field recursive dynamic model along a flight path of the aircraft using geomagnetic field data collected by the console via at least one of the magnetometers over the flight path and the local geomagnetic field model parameters when the airborne geomagnetic field survey mission is executed;

getting a measuring error model along the flight path using an attitude measuring error obtained by the console when the aircraft flies as per a preset attitude;

getting an estimation of the geomagnetic field data collected by the console via at least one of the magnetometers over the flight path in a geographic coordinate frame using the geomagnetic field recursive dynamic model and the measuring error model, wherein the estimation is obtained via the console.

2. The method according to claim 1, wherein the geomagnetic field data collected by the console on the flight path is decomposed using the local geomagnetic field model parameters to get a DC component and harmonic components in each direction, and the harmonic components in each direction are discretized to get the geomagnetic field recursive dynamic model over the flight path.

3. The method of claim 1, wherein the magnetometers are of different modalities of operation.

4. The method according to claim 1, further comprising:
selecting a plurality of observation points in an area to be tested,
collecting the geomagnetic field data of the plurality of observation points using the mobile earth station, and
estimating the local geomagnetic field model parameters in the area to be tested using the geomagnetic field data of the plurality of observation points, wherein the geomagnetic field data includes a total-field and vector component, and the local geomagnetic field model parameters include a DC component parameter of a local geomagnetic field model and a plurality of harmonic component parameters.

5. The method according to claim 4, wherein the plurality of observation points are distributed on a baseline which is a straight line with the length of L and original at a reference point $x_0$, and the baseline coincides with a magnetic north.

6. The method according to claim 1, wherein the console obtains the attitude measuring error through a positioning and orientation system.

7. The method according to one of claim 6, further comprising:
getting a Kalman filter using the geomagnetic field recursive dynamic model and the measuring error model, and
getting the estimation of the geomagnetic field data collected over the flight path in the geographic coordinate frame through the Kalman filter.

8. The method according to claim 7, further comprising:
detecting a geomagnetic field for abnormality using a data stream in the Kalman filter.

9. An air-ground integrated geomagnetic field combined observation system comprising:
a mobile earth station and a console,
wherein the mobile earth station is used for validating local geomagnetic field model parameters using geomagnetic field data collected by the mobile earth station before an airborne geomagnetic field survey mission is executed by an aircraft hosting the console and a magnetic-free tail stinger including a plurality of magnetometers, wherein the console includes the magnetometers;
wherein the console is used for getting a geomagnetic field recursive dynamic model along a flight path of the aircraft using geomagnetic field data collected by the console via at least one of the magnetometers over the flight path and the local geomagnetic field model parameters when the geomagnetic airborne field survey mission is executed; getting a measuring error model along the flight path using an attitude measuring error obtained when the aircraft flies as per a preset attitude; getting an estimation of the geomagnetic field data collected by the console via at least one of the magnetometers over the flight path in a geographic coordinate frame using the geomagnetic field recursive dynamic model and the measuring error model.

10. The system of claim 9, wherein the magnetometers are of different modalities of operation.

11. The system according to claim 9, wherein the console uses the geomagnetic field recursive dynamic model and the measuring error model to get a Kalman filter, and get the estimation of the geomagnetic field data collected over the flight path in the geographic coordinate frame through the Kalman filter.

12. The system according to claim 11, comprising:
a magnetometer, used for detecting a geomagnetic field for abnormality using a data stream in the Kalman filter.

* * * * *